United States Patent

[11] 3,611,930

[72] Inventor Robert S. Kensinger
      Minneapolis, Minn.
[21] Appl. No. 560,707
[22] Filed June 27, 1966
[45] Patented Oct. 12, 1971
[73] Assignee Honeywell, Inc.
      Minneapolis, Minn.

[54] SPHERICAL SHAPED BODY WITH AERODYNAMIC TORQUE RIBS
6 Claims, 3 Drawing Figs.

[52] U.S. Cl. ................................................. 102/4, 102/7.2
[51] Int. Cl. ......................................... F42b 25/20, F42b 25/24
[50] Field of Search ........................................ 102/3, 4, 64, 92.1, 7.2; 244/3.23

Primary Examiner—Benjamin A. Borchelt
Assistant Examiner—C. T. Jordan
Attorneys—Roger W. Jensen, Charles J. Ungemach and Albin Medved CLAIM: 1. A generally spherically shaped member having a plane of symmetry and an axis passing substantially through the geometric center of said member normal to said plane of symmetry, said member further having external aerodynamic features which will cause it, when placed into an airstream, to spin about said axis regardless of the orientation of said member relative to the airstream, said aerodynamic features including a plurality of torque ribs, each of said ribs having: an aerodynamic force centered on said plane of symmetry and extending a short distance to either side of it; a front face having a first part extending from one side of said aerodynamic fence for a short distance substantially parallel to said plane of symmetry, then curving in a circular radius away from said plane of symmetry into a segment at an angle to said plane of symmetry, said face further having a second part extending from the other side of said aerodynamic fence, said second part being substantially symmetrical to said first part with reference to said plane of symmetry; and a rear face providing a smooth streamlined surface extending towards the rear and downward from the upper edge of said front face and merging with the spherical surface of the member.

PATENTED OCT 12 1971          3,611,930

INVENTOR.
ROBERT S. KENSINGER

BY Roger W. Jensen
ATTORNEY

SPHERICAL SHAPED BODY WITH AERODYNAMIC TORQUE RIBS

The present invention pertains to fluid motion responsive devices wherein said device or a member within said device is caused to spin in response to the relative motion between the member and the fluid. More particularly, the present invention provides a generally spherically shaped member having aerodynamic features which will cause it to spin about a predetermined axis whenever the member is placed in a stream of fluid or gas. The member will be caused to spin about the predetermined axis no matter what the relative orientation of the member and the stream may happen to be.

An example where the present invention will find application are bombs equipped with centrifugal arming fuses. Proper operation of such a bomb requires that prior to the impact with the target, the bomb must attain a certain degree of rotational velocity about a predetermined arming axis. The aerodynamic design according to the present invention induces the rotation of the bomb about fixed fuse arming axis, at a rate sufficient to accomplish the arming, regardless of the bomb orientation relative to the air stream.

The design calls for a housing member having a generally spherical shaped outer surface and a plurality of aerodynamic torque ribs incorporated into the external design of the member to provide the required spin rate for fuse arming. The design is symmetrical about a plane of symmetry which cuts the member into substantially two equal parts. The fuse is internally mounted with the arming axis fixed to the bomb geometric center normal to the plane of symmetry. The fuse arming requires unidirectional spin of a predetermined angular rate about the fuse arming axis.

The aerodynamic torque rib profile is a flat front face normal to the local curvature of the sphere with the rear face suitably streamlined. The spanwise contour of the front face is of prime importance in generating all attitude spin. Each rib consists of a flat aerodynamic fence centered on the plane of symmetry and extending a short distance to either side of it. This aerodynamic fence is substantially normal to the local curvature of the sphere and normal to the plane of symmetry. The front face has two parts, each part extending from one side of the aerodynamic fence. The first part of the face extends from one side of the aerodynamic fence, for a short distance substantially parallel to the plane of symmetry. The face is faired from the fence in a circular radius into a constant 20° sweep back continuing to the rib tip. The second part of the face, extending from the other side of the aerodynamic fence, is symmetrical to the first part with reference to the plane of symmetry.

The bomb is released into the air stream with random orientation. The absolute velocity vector can be considered as two components parallel and perpendicular to the bomb plane of symmetry. Flow parallel to the plane of symmetry will produce a net torque about the fuse arming axis by virtue of the pressure drag across the torque ribs. Flow normal to the plane of symmetry is initially deflected by the swept rib then turned parallel to the plane of symmetry by the curved aerodynamic fence. Reaction to the momentum change in the flow produces a torque about the fuse arming axis. As a consequence, the rib design produces a net torque about the arming axis regardless of the orientation relative to the air stream. Test data show spin sensitivity to yaw attitude of 1.45 to 1.0.

Prior art designs utilized either swept or unswept ribs and straight aerodynamic fences. Design data for unswept ribs shows that spin rate begins to decrease rapidly at yaw attitudes of about 30° decreasing to zero between 70 and 90°. Swept ribs and straight fence ribs are both capable of producing all attitude spin. However, the best swept rib design exhibits a spin sensitivity to yaw attitude of 4 to 1 and the best straight fence design exhibits a sensitivity of 3 to 1.

It is, therefore, an object of the present invention to provide a member with aerodynamic features which will cause it, or when placed into a stream of fluid or gas, to spin about a predetermined axis regardless of the orientation of said member relative to the stream.

A more specific object of the present invention is to provide an aerodynamic design for a bomb which will induce rotation of the bomb about a fixed fuse arming axis at a rate sufficient for arming regardless of the bomb orientation relative to the air stream.

These and further objects will become apparent to those skilled in the art upon examination of the specification, the claims, and the drawing, in which:

Figure 1:
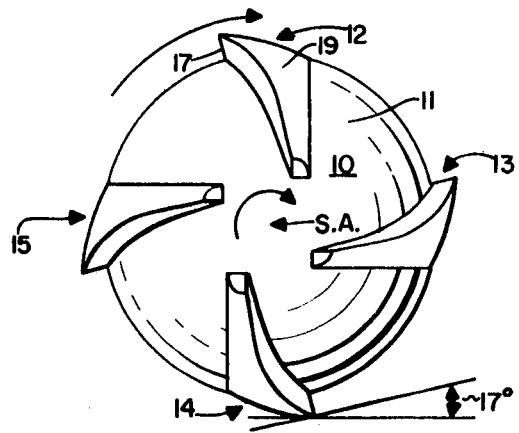
FIG. 1 is a view along the spin axis of a member shaped according to the present invention.
Figure 2:
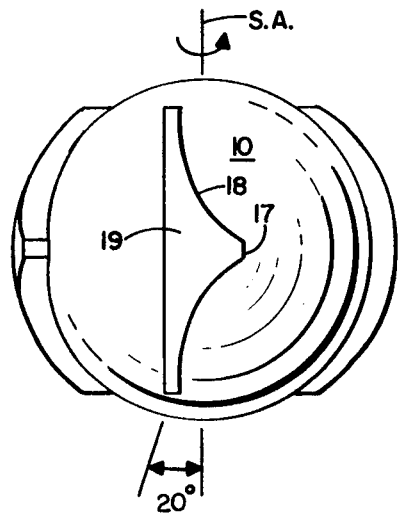
FIG. 2 is a view transferred to the axis of the member illustrated in FIG. 1.

FIG. 1 illustrates a member 10 with a generally spherical external surface 11. Protruding from surface 11 are four aerodynamically shaped ribs 12, 13, 14, and 15. A plane of symmetry dividing member 10 into two equal halves is parallel to the surface of the drawing, and a spin axis, about which member 10 is caused to rotate, is shown in FIG. 1 as passing through the center of member 10 in a direction normal to the face of the drawing. By referring to FIG. 2, these relationships will become more apparent. In FIG. 2, the spin axis is shown parallel with the paper and the plane of symmetry shown normal to the paper.

The four aerodynamic ribs characterizing the external surface of member 10 are centered on the plane of symmetry and extend on each side generally in the direction of the spin axis. Each rib exhibits symmetry about the plane of symmetry and the span of the rib on each side of the plane of symmetry is more than 45° but less than 90° of the spherical curvature. Each rib has a flat aerodynamic fence 17 centered on the plane of symmetry and extending a short distance to either side of it. This aerodynamic fence is generally perpendicular to the local curvature of the member. Extending from each end of aerodynamic fence 17 is a front face 18 also substantially normal to local curvature. A front face 18 extends from the end of the aerodynamic fence 17 for short distance substantially parallel to the plane of symmetry. It then curves in a circular radius away from the plane of symmetry toward the spin axis, and terminates somewhere between 45° and 90° away from the plane of symmetry. The other half of each rib is exactly symmetrical to the first half. Aerodynamic fence 17 and front face 18 each have a top edge which is substantially parallel to the local curvature. A rear fence 19 connects the top edges of the front face and the aerodynamic fence with a smooth streamlined surface extending towards the rear and downward from the upper edges. The top view of the rib profile can be more easily seen in FIG. 2.

The downward slope of rear face 19, just behind the top edge of aerodynamic fence 17, is optimal at approximately between 17 and 18° with respect to the tangent to the surface curvature at the intersection of the plane of symmetry and the aerodynamic fence. At a lesser angle the tendency of the air stream is to reattach to the member after it is separated at the junction of the fence face 17 and rib face 18 with the rear face 19. At an angle which is substantially larger, the efficiency is reduced by the negative torque resulting from the air stream pressure on the rear face of the rib located on the side diametrically opposed to the rib whose front surface is exposed to the air stream.

The contour of front face 18 can be best seen in the illustration of FIG. 2. Face 18 starts from the end of aerodynamic fence 17 and is at first parallel to the plane of symmetry. The face 18 then curves in a circular radius away from the plane of symmetry into a segment on constant angular separation from a great circle passing through the center of radius of the front face curvature and the spin axis. This constant angle of separation is optimum between 15 to 25°. An angle of 20° has been chosen in a test model and has been found to give satisfactory operation.

Figure 3:
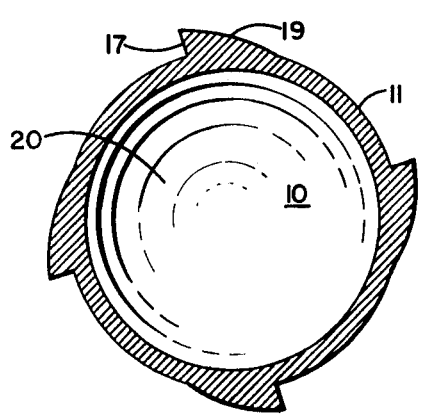
FIG. 3 is a view of the same member along the axis cut away at the plane of symmetry.

The cutaway view of FIG. 3, cut along the plane of symmetry, illustrates that the member may have an internal cavity or chamber 20. When the design is used as a container or shell for a bomb, the internal space can be filled with explosive charge and a centrifugal arming fuse. The fuse is internally mounted with the arming axis fixed to the bomb geometric center normal to the plane of symmetry along the axis of the member. In a typical fuse, the arming requires unidirectional spin of approximately 40 revolutions per second about the fuse arming axis. Tests have shown that the present design will allow a bomb to get this magnitude of angular velocity after the bomb is released into an air stream with random orientation. The flow parallel to the plane symmetry will produce a net torque about the fuse arming axis by virtue of the pressure drag across the torque rib. Flow normal to the plane of symmetry is initially deflected by swept rib then turned parallel to the plane of symmetry by the curved front face. Reaction to the momentum change in the flow produces a torque about the fuse arming axis. As a consequence, the rib design produces a net torque about the arming axis regardless of the orientation relative to the air stream.

Many variations and embodiments are possible within the spirit of this invention. It is, therefore, understood that the specific embodiment of my invention shown here is for the purpose of illustration only, and that my invention is limited only by the scope of the appended claims.

I claim:

1. A generally spherically shaped member having a plane of symmetry and an axis passing substantially through the geometric center of said member normal to said plane of symmetry, said member further having external aerodynamic features which will cause it, when placed into an air stream, to spin about said axis regardless of the orientation of said member relative to the air stream, said aerodynamic features including a plurality of torque ribs, each of said ribs having an aerodynamic fence centered on said plane of symmetry and extending a short distance to either side of it;

a front face having a first part extending from one side of said aerodynamic fence for a short distance substantially parallel to said plane of symmetry, then curving in a circular radius away from said plane of symmetry into a segment at an angle to said plane of symmetry, said face further having a second part extending from the other side of said aerodynamic fence, said second part being substantially symmetrical to said first part with reference to said plane of symmetry; and a rear face providing a smooth streamlined surface extending towards the rear and downward from the upper edge of said front face and merging with the spherical surface of the member.

2. A generally spherically shaped member having a plane of symmetry and an axis passing substantially through the geometric center of said member normal to said plane of symmetry, said member further having external aerodynamic features which will cause it, when placed into an air stream, to spin about said axis regardless of the orientation of said member relative to the air stream, said aerodynamic features including a plurality of torque ribs, each of said ribs having:

a flat aerodynamic fence substantially normal to the local curvature of said member and normal to the plane of symmetry, said fence being centered on said plane of symmetry and extending a short distance to either side of it;

a front face substantially normal to the local curvature and having an upper edge generally parallel to the local curvature, said face having a first part extending from one side of said aerodynamic fence, for a short distance substantially parallel to said plane of symmetry, then curving in a circular radius away from said plane of symmetry into a segment of constant angular separation from a greater circle passing through said axis and the center of said circular radius, said face further having a second part extending from the other side of said aerodynamic fence, said second part being symmetrical to said first part with reference to said plane of symmetry; and a rear face providing a smooth streamlined surface extending towards the rear and downward from the upper edge of said front face and merging with the spherical surface of the member.

3. Apparatus according to claim 2, wherein the constant angular separation of said segment of said front face is more than 15° but less than 25°.

4. Apparatus according to claim 2, wherein said member has an internal cavity.

5. Apparatus according to claim 2, wherein said member is a bomb shell and is further characterized by an internal chamber for receiving explosive charge and a centrifugal arming fuse.

6. Apparatus according to claim 2, wherein the downward slope of said rear face just behind the top edge of said aerodynamic fence is more than 17° but less than 18° with respect to the tangent to the surface curvature at the intersection of the plane of symmetry and said aerodynamic fence.